US009983555B2

(12) United States Patent
Bengtson

(10) Patent No.: US 9,983,555 B2
(45) Date of Patent: May 29, 2018

(54) DISTRIBUTED FAULT-TOLERANT CONTROL AND PROTECTION SYSTEM

(75) Inventor: John Bengtson, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 520 days.

(21) Appl. No.: 14/008,214

(22) PCT Filed: Mar. 29, 2012

(86) PCT No.: PCT/DK2012/050097
§ 371 (c)(1),
(2), (4) Date: Dec. 9, 2013

(87) PCT Pub. No.: WO2012/130246
PCT Pub. Date: Oct. 4, 2012

(65) Prior Publication Data
US 2014/0081473 A1     Mar. 20, 2014

(30) Foreign Application Priority Data
Mar. 30, 2011   (DK) .......................... PA 2011-70152

(51) Int. Cl.
*G05B 15/02*   (2006.01)
*G05B 9/02*   (2006.01)
(Continued)

(52) U.S. Cl.
CPC ............... *G05B 15/02* (2013.01); *F03D 7/00* (2013.01); *F03D 7/047* (2013.01); *G05B 9/02* (2013.01);
(Continued)

(58) Field of Classification Search
CPC ....................................................... F03D 7/00
(Continued)

(56) References Cited

U.S. PATENT DOCUMENTS 5,809,220 A * 9/1998 Morrison ................. G05B 9/03
714/12
7,200,469 B2 * 4/2007 Katrak .................. B60W 10/04
123/349

(Continued)

FOREIGN PATENT DOCUMENTS

CN           1536842 A      10/2004

OTHER PUBLICATIONS

Elia ("Analysis of Ethernet-based safe automation networks according to IEC61508", p. 333-340, IEEE, 2006).*
(Continued)

*Primary Examiner* — Christopher E. Everett
(74) *Attorney, Agent, or Firm* — Patterson + Sheridan, LLP

(57) ABSTRACT

The present invention relates to a distributed fault-tolerant control system for a modularized wind turbine or wind power plant system comprising sub-assemblies, the control system comprising 1) fault-tolerant control means adapted to generate control set-points and/or data values, said fault-tolerant control means being distributed in sub-assemblies in accordance with the modularization of the wind turbine or wind power plant system, and 2) fault-tolerant communication network for transmitting control set-points and/or data values at essentially the same time to a plurality of nodes in the distributed control system, said plurality of distributed nodes being capable of selecting a valid transmission package out of two or more transmission packages provided on the fault-tolerant communication network.

24 Claims, 10 Drawing Sheets

(51) Int. Cl.
*F03D 7/04* (2006.01)
*F03D 7/00* (2006.01)

(52) U.S. Cl.
CPC ....... *F05B 2260/845* (2013.01); *Y02E 10/723* (2013.01)

(58) Field of Classification Search
USPC .............................................. 700/287; 3/287
See application file for complete search history.

(56) References Cited

U.S. PATENT DOCUMENTS

| | | | |
|---|---|---|---|
| 8,301,885 B2* | 10/2012 | Kopetz | H04L 12/4015 370/464 |
| 2004/0205253 A1 | 10/2004 | Arndt et al. | |
| 2005/0117596 A1* | 6/2005 | Kopetz | H04J 3/0655 370/401 |
| 2005/0240287 A1 | 10/2005 | Glanzer et al. | |
| 2007/0210213 A1* | 9/2007 | Levin | B64G 1/44 244/172.7 |
| 2008/0118354 A1* | 5/2008 | Jeppesen | F03D 7/0224 416/1 |
| 2009/0216910 A1* | 8/2009 | Duchesneau | G06F 9/5072 709/250 |
| 2009/0309360 A1* | 12/2009 | Jurkat | F03D 7/047 290/44 |
| 2010/0183016 A1* | 7/2010 | Bonk | G06F 1/14 370/400 |
| 2010/0262263 A1 | 10/2010 | Karaffa et al. | |

OTHER PUBLICATIONS

Bell ("Introduction to IEC61508", p. 1-10, IEEE, 2005).*
NPL_State Intellectual Property Office (SIPO) of the People's Republic of China, Office Action dated May 24, 2016.
International Search Report and Written Opinion, PCT/DK2012/050097, dated Jun. 15, 2012.

* cited by examiner

DISTRIBUTED FAULT-TOLERANT CONTROL AND PROTECTION SYSTEM

FIELD OF THE INVENTION

The present invention relates to wind power facility control systems utilizing distributed control nodes with fault-tolerant and safety-related properties. The distributed control nodes are connected by a deterministic fault-tolerant communication network. The distributed control nodes comprise decentralized voting schemes, said decentralized voting schemes aiming at selecting the most reliable control set-point or data value among a plurality of available control set-points or data values. The distributed control nodes comprise inherent voting functions in terms of electronic, electrical or hydraulic circuitry.

BACKGROUND OF THE INVENTION

Modern wind turbines are designed for series production. Modularization is used as a means to establish a lean production of sub-assemblies. It is therefore desirable to modularize the control system in accordance with the wind turbine modularization to enable sub-assembly manufacturing and testing in a lean production set-up.

Modern power plants comprise not only wind turbines but also other facilities as e.g. power measurement systems, phase compensation systems, metrology systems, switch gear systems and energy storage systems. Such systems can also be modularized to enable sub-assembly manufacturing and testing in a lean production set-up. The systems themselves can be considered modules in a wind power plant and thus hold distributed control nodes. It is considered beneficial to modularize the control system in accordance with the system modularization.

Modern wind turbines and other power plant systems are subject to high requirements to availability and power production and consequently production stops caused by the control system are considered unacceptable. The reliability requirements to wind turbine control systems are therefore very high. Fault-tolerant based control systems are means to obtain desired reliability and safety requirements.

Modern wind turbines are subject to high safety requirements. Large modern wind turbines have high demands on functional safety. The control system must have functional safety properties to support the demands. Energy storage facilities, power converter systems, power switch gears systems and other power plant systems may also have high demands on functional safety as the impact of failures can be severe both in relation to human health and damage to assets.

Fault-tolerant control systems for wind power plants are typically implemented as redundant systems comprising duplicates of various critical plant modules/devices. In case a critical plant module/device fails its functionality is taken over by a similar plant module/device.

U.S. 2009/0309360 and U.S. 2009/0309361 both discuss a method and a system for controlling a wind energy park. In U.S. 2009/0309360 and U.S. 2009/0309361 a main communication unit controls a number of prioritised control units. In case a given control unit with a given priority fails, the main communication unit selects a lower prioritised control unit to take over the functionality of the defective control unit.

It is a disadvantage of the method and system suggested in U.S. 2009/0309360 and U.S. 2009/0309361 that the main communication unit selects which control unit to take over in case another control unit breaks down or in any other way malfunctions. However, in case the main communication unit itself breaks down, no replacement unit is available.

Thus, the control method and the control system suggested in U.S. 2009/0309360 and U.S. 2009/0309361 can not be considered a fault-tolerant control method/system—at least not on the main controller level. Moreover, the control method and the control system suggested in U.S. 2009/0309360 and U.S. 2009/0309361 can not be considered safe as no safety features are implemented.

It may be seen as an object of embodiments of the present invention to provide a distributed control system with inherent fault-tolerant and safety-related properties for wind power plant applications.

DESCRIPTION OF THE INVENTION

The above-mentioned object may be complied with by providing, in a first aspect, a distributed fault-tolerant control system for a modularized wind power facility comprising sub-assemblies, the control system comprising
  fault-tolerant control means adapted to generate control set-points and/or data values, said fault-tolerant control means being distributed in sub-assemblies in accordance with the modularization of the wind power facility, and
  a fault-tolerant communication network for transmitting control set-points and/or data values at essentially the same time to a plurality of nodes in the distributed control system, said plurality of distributed nodes being capable of selecting a valid transmission package out of two or more transmission packages provided on the fault-tolerant communication network.

The following advantages are associated with the first aspect of the present invention:
  1. The distributed control system architecture of the present invention is compliant with the modularization of modern wind power facilities, such as modern wind turbines and modern wind power plants.
  2. The fault-tolerant distributed control system architecture of the present invention fulfills the high requirements to availability and reliability that are posed on modern wind turbine and wind power plant control systems.
  3. The fault-tolerant distributed control system architecture of the present invention enable integration of electronic, electrical and hydraulic voting functions that beneficially support series production of sub-assemblies.
  4. The distributed control system architecture of the present invention integrates functional safety and is able to support the low demand mode, high demand mode and continuous mode classes of safety-related functions defined in the IEC61508 standard.
  5. The distributed control system architecture of the present invention is scalable and flexible in a way that enables tailoring of functionality to various wind turbine platforms and wind power plant applications.

The control system architecture of the present invention generally reflects the established design principle "form follows function". As mentioned above the control system architecture of the present invention is applicable in wind turbines, wind power plants, power sub-stations, energy storage systems, metrology stations and in other power related applications.

The control system architecture may comprise primary controllers as e.g. Main Controllers (MC), Turbine Controllers (TC), Safety Controllers (SC), Power Controllers (PC), Diagnostic Controllers (DC).

Moreover, the control system may comprise Distributed Control Nodes (DCNs) that interface to sensors and actuators. The DCNs may serve as data acquisition nodes, control output nodes for one or more primary controllers or as autonomous controllers in the system. The DCNs may have integrated safety-related functions that support functional safety at system level. The safety-related functions can be autonomous or they can be controlled from one or more SCs.

Primary controllers and DCNs may be single, double or multiple fault-tolerant to support the system structure and desired reliability. Moreover, primary controllers and distributed control nodes may be replica deterministic to support fault-tolerance at system level.

The control system architecture of the present invention may apply a deterministic fault-tolerant real-time communication network (RTCN) with high reliability and safety-related properties.

As already mentioned the communication network may comprise a real-time communication network, such as a time-triggered Ethernet. The time-triggered Ethernet communication network may be implemented as a single fault-tolerant network, a double fault-tolerant network or even a multi fault-tolerant network. Moreover, the time-triggered Ethernet communication network may be safety certified.

The communication network may support functional safety classes low demand mode, high demand mode and continuous mode, as defined in the IEC61508 standard.

The functional safety functions are compliant with the requirements for Safety Integrity Level 2 (SIL 2) or Safety Integrity Level 3 (SIL 3).

The distributed fault-tolerant control system may further comprise fault-tolerant sensor systems comprising a plurality of sensors. The plurality of sensors may be arranged in a redundant manner. The plurality of sensors are adapted to measure at least one parameter relevant for the control of at least one sub-system of the wind power facility.

Examples of wind turbine sub-assemblies are blade pitch systems, yaw systems, main shaft systems, gear systems, generator systems, power converter systems, and switch gear systems.

The distributed fault-tolerant control system, and in particular the distributed control nodes, may further comprise voting means adapted to vote between data values from a plurality of sources, said voting means being adapted to vote in accordance with the 1 out of 2 (1oo2), 2 out of 2 (2oo2), 2 out of 3 (2oo3) or other suitable voting principle. The sources for providing data values may include one or more primary controllers.

At least two redundant primary controllers may be arranged in a replica deterministic configuration. The at least two redundant primary controllers may comprise an active primary controller and one or more hot stand-by controllers. Alternatively, the at least two redundant primary controllers may comprise an active primary controller and one or more cold stand-by controllers.

In a second aspect the present invention relates to a distributed fault-tolerant control system for controlling one or more objects of a wind power facility, the control system comprising fault-tolerant control means exhibiting fail-safe behaviour adapted to control one or more objects,
electronic, electrical or hydraulic voting means for fault-tolerant control of the one or more objects, and
means for supervision and/or diagnosis of voting means Similar to the first aspect the term wind power facility covers individual wind turbines or groups of wind turbines forming a wind power plant.

The one or more objects to be controlled may involve blade pitch systems, yaw systems, main shaft systems, gear systems, generator systems, power converter systems, and switch gear systems.

The distributed fault-tolerant control system according to the second aspect may further comprise a replica deterministic control scheme. Similar to the first aspect of the present invention the distributed control system may support single fault-tolerance, double fault-tolerance or multiple fault-tolerance.

Distributed power supply units adapted to support one partition out of a plurality of partitions may be provided as well. Moreover, fault domain decoupling between partitions may be supported.

In a third aspect the present invention relate to a method for controlling a modularized wind power facility comprising sub-assemblies, the method comprising the steps of generating control set-points and/or data values using fault-tolerant control means, said fault-tolerant control means being distributed in sub-assemblies in accordance with the modularization of the wind turbine facility,
transmitting the generated control set-points and/or data values at essentially the same time to a plurality of nodes in the distributed control system via a fault-tolerant communication network, and
selecting, using the plurality of distributed nodes, a valid transmission package out of two or more transmission packages provided on the fault-tolerant communication network.

In a fourth and final aspect the present invention relates to a method for controlling one or more objects of a wind power facility, the method comprising the steps of:

providing a fault-tolerant control means exhibiting fail-safe behaviour adapted to control one or more objects,
providing electronic, electrical or hydraulic voting means for fault-tolerant control of the one or more objects, and
supervising and/or diagnosing of the voting means.

The method according to the third and fourths aspect may be applicable in wind turbines, wind power plants, sub-stations, energy storage systems, metrology stations and in other wind power plant applications.

It is an advantage of the above-mentioned methods that they are compliant with modularization of modern wind power facilities, such as modern wind turbines and modern wind power plants. Moreover, the methods, if it is executed on a fault-tolerant distributed control system, fulfill the high requirements to availability and reliability that are posed on modern wind turbine and wind power plant control systems.

Also, the methods allow that distributed control system architectures are scalable and flexible in a way that enables tailoring of functionality to various wind turbine platforms and wind power plant applications.

BRIEF DESCRIPTION OF THE DRAWINGS

The present invention will now be explained in further details with reference to the accompanying figures, where.

Figure 1:
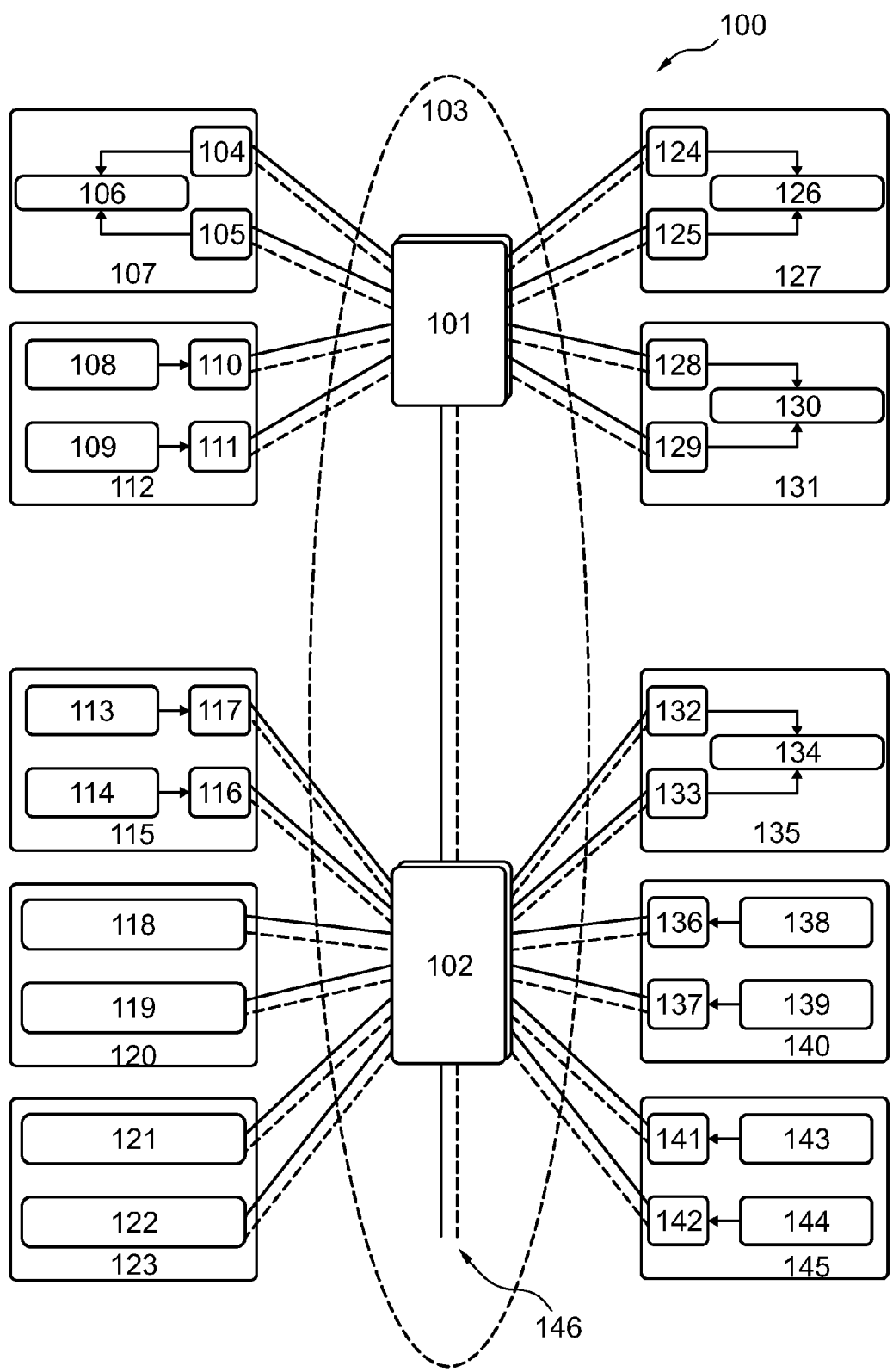
FIG. 1 shows a first embodiment of a generic distributed control system.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims

DETAILED DESCRIPTION OF THE INVENTION

In general, the present invention aims at providing a distributed control system for wind power facilities, such as wind turbines and/or other systems in a wind power plant. In preferred embodiments of the invention, the distributed control system has fault-tolerant properties that support high reliability and safety.

According to the present invention, fault-tolerant control in the distributed control system is accomplished by redundant functions that allow continued operation in case one or more functions in a redundant set of functions is/are failing. Redundant functions are established by two or more physical partitions. The physical partitions can be entirely separate units or it can be single physical units with internal partition or a combination hereof.

In an embodiment of the invention, the physical partitions form separate fault domains where a single fault on one domain cannot jeopardize the function of the other redundant partition or any other part of the control system. Also, each redundant function may have local power supplies supporting the control function and connected sensors and actuators. This ensures that a failure in one power supply domain cannot influence the function of other domains in the control system.

Redundantly arranged primary controllers provide a method and a system that support voting between data values. Redundantly arranged DCNs controlling objects of a wind power facility provide a method and a system that support decentralized voting between data values. The voting can be in terms of dedicated voting circuitry or in terms of simultaneous control of the controlled object by the redundant functions.

In an embodiment of the invention, the DCNs holding the redundant voting functions integrate voting functions in terms of electronic, electrical or hydraulic voting circuitry. The nodes may also integrate supervisory circuitry and diagnostic functions for the voting circuitries that supports the desired reliability and safety of the functions. The integration of voting functions may be a desired property in relation to safety, fault-tolerance, manufacturing and testing.

In an embodiment of the invention, the primary controllers are replica deterministic which means that they produce the same output at essentially the same time. This property enables continued control in case of a single failure in a primary controller. The property is especially desirable in continuous mode safety-related functions where temporary loss of control is considered critical or in functions where very high availability is required. Moreover, the redundant functions controlling objects of the wind power facility may be replica deterministic which means that the functions produce the same output at essentially the same time. This property prevents erroneous voting caused by different computational trajectories in the functions from occurring. The redundant functions may have fail-safe properties, sometimes also called fail-silent properties, which means that the functions will fail to a passive state in case of internal failure. This property prevents a failed controller from jeopardizing the operation of non faulty controllers. The fail-safe property is enforced by design and has a high probability of correct function. In safety-related functions, the fail-safe property has a Safety Integrity Level (SIL) that is compliant with the overall safety requirements for the control function.

According to the present invention, fault-tolerant control in the distributed control system is accomplished by providing a method and a system that support decentralized voting between control set-points or data values—i.e. where the selection of a set-point or data value is performed at the consuming node. A control set-point may reflect logic control data from a Main Controller, Turbine Controller, Safety Controller, Power Plant Controller or any other controller. A data value may reflect measured data from a data acquisition function or from any other data source in the system.

It must be noted that controllers and nodes can reside in an entire wind power plant and thus this invention is not limited to comprise controllers and nodes within a single wind turbine.

Referring now to FIG. 1, sensors systems 108, 109, 113, 114, 138, 139, 143 and 144 for measurement of e.g. power, frequency, voltage, current, pressure or temperature are connected to respective replicated DCNs 110, 111, 117, 116, 136, 137, 141 and 142, either directly or optionally through e.g. field busses, peer-to-peer communication paths or any other type of interface. The sensor systems are positioned in Sub-System Assemblies (SSA) 112, 115, 140 and 145 together with associated DCNs. Other SSAs 107, 127, 131 and 135 comprise DCNs 104, 105, 124, 125, 128, 129, 132 and 133 for controlling respective objects 106, 126, 130, 134 of the wind power facility.

The replicated DCNs acquire data from the sensor systems and publish the acquired data on the RTCN 103, thus making the data available to other DCNs in the system via replicated RTCN switches 101, 102.

Sensors that are replicated for the purpose of fault-tolerance or safety are most preferably connected to different DCNs in order to achieve the highest level of fault-tolerance and reliability.

Any DCN may have the capability to vote between set-point values or data values provided by primary controllers or other RTCN switches in the system. Set-points and data values can represent control logic, sensor data or other data sources.

A possible scenario could be that a voter votes in accordance with the principle "2 out of 3" (2oo3)—i.e. if one of the set-point values or data values deviates significantly from the 2 others, the deviating set-point value or data value is ignored. It should be noted however, that the voting process is not limited to the 2oo3 voting scheme, i.e. other voting schemes are applicable as well.

Still referring to FIG. 1 a layout of a single fault-tolerant generic RTCN 103 according to an embodiment of the present invention is depicted. The single fault-tolerant property of the RTCN 103 is illustrated by the solid and dotted communication paths between the replicated RTCN switches 101, 102 and the various DCNs of the RTCN 103.

As seen in FIG. 1 Main Controllers 118, 119 of SSA 120, Safety Controllers 121, 122 of SSA 123 and DCNs of other SSAs are connected via the RTCN 103 that utilizes RTCN switches 101, 102. The replicated RTCN switches 101, 102 are connected in a star-branch-star topology. However, other network topologies are also applicable.

The RTCN 103 serve as the communication infrastructure that connects all DCNs in the system. The RTCN 103 can have connection to the power plant communication network through other RTCN switches 146. The RTCN 103 may be non fault-tolerant, single fault-tolerant or double fault-tolerant depending on the reliability requirements.

The RTCN 103 could be based on an industrial communication network such as Ethernet/IP, Ethernet POWERLINK, PROFInet-IRT or other communication networks with similar properties In a preferred embodiment, the RTCN is a highly deterministic communication network with time-triggered properties. Such network could be TTEthernet or other communication networks having similar properties. This type of RTCN makes data available at essentially the same time on the redundant RTCN channels and thus provides strong support for fault-tolerance at system level.

TTEthernet combine the advantages of the time-triggered communication paradigm with the flexibility of the wide spread Ethernet. It supports standard Ethernet traffic while ensuring non-interference with critical data traffic. In such communication paradigms, the communication of real-time data on the RTCN is planned in the design phase and the associated nodes have a priori knowledge of when data is available. The TTEthernet also provides a fault-tolerant precision global time to all nodes in the system. These properties enable that two or more replicated nodes by subscription to the same data can be guaranteed to operate on the same data at the same time and, due to the precision global time, be designed to execute the same functions at essentially the same time, and thus be replica deterministic.

Preferably, the RTCN has specific properties that support "continuous mode" safety-related functions as defined in the IEC61508 standard. Continuous mode safety functions would depend on safety-related data communicated between nodes on the RTCN to perform the safety function. TTEthernet inherently supports continuous mode safety functions by its fault-tolerant and by safety-related properties. The TTEthernet communication system is safety certifiable. By utilizing this type of communication network, the capability of the fault-tolerant architecture of the present invention can be extended to comprise all classes of safety functions: low demand mode, high demand mode and continuous mode safety functions in accordance with the definitions in the IEC61508 standard.

Figure 7:
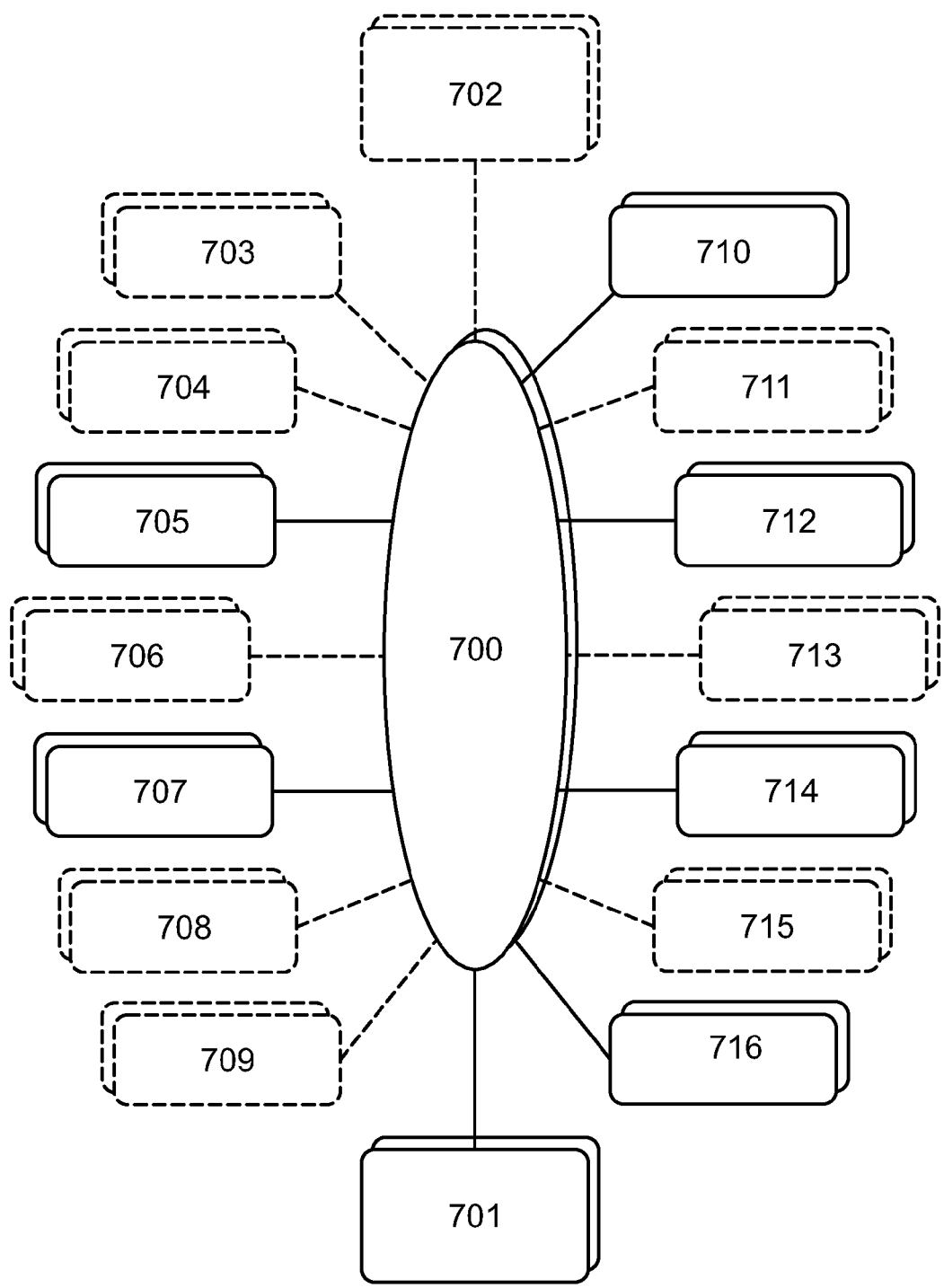
FIG. 7 shows a generic view of a main controller execution domain.
Figure 8:
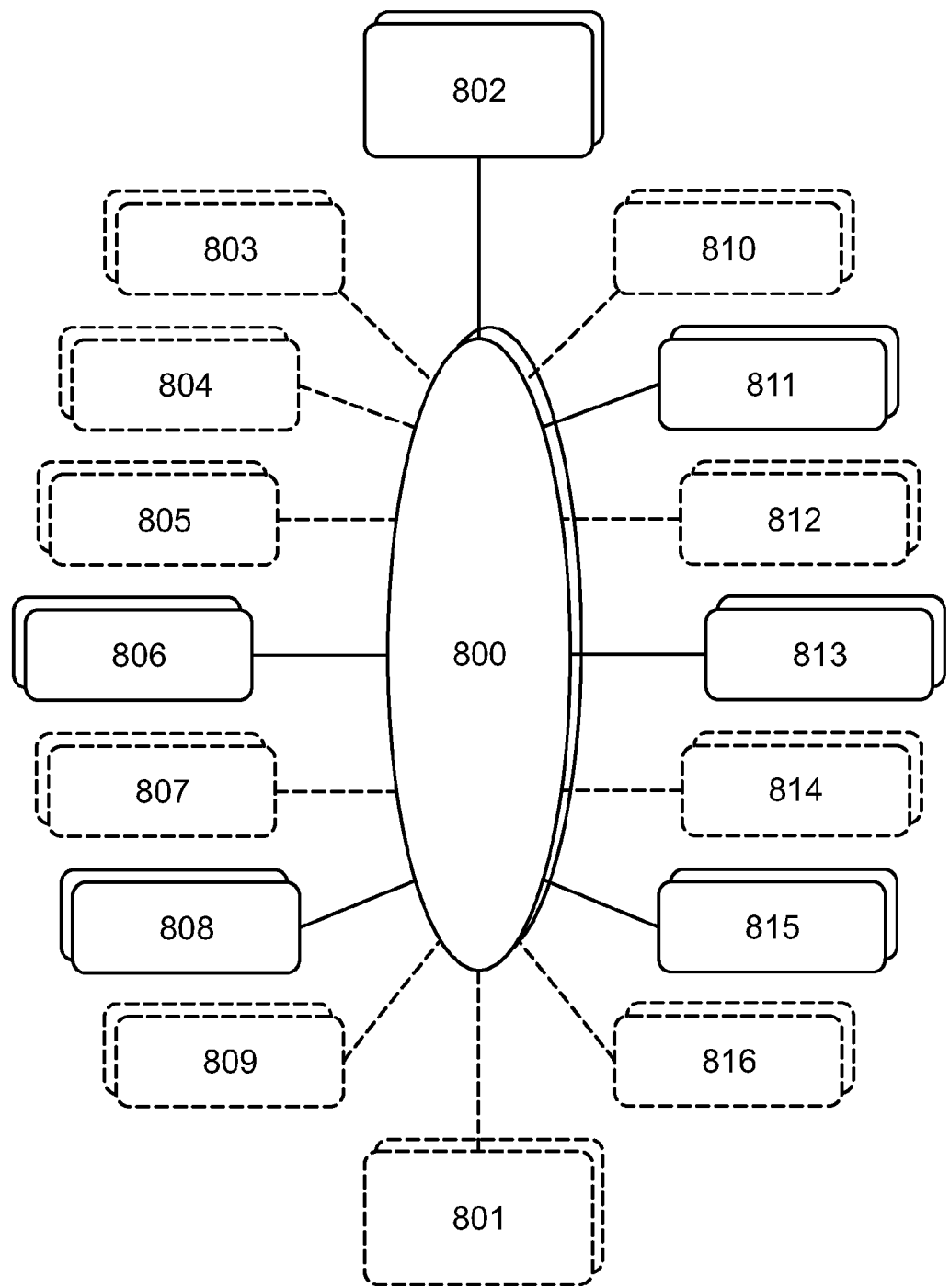
FIG. 8 shows a generic view of a safety controller execution domain.
Figure 9:
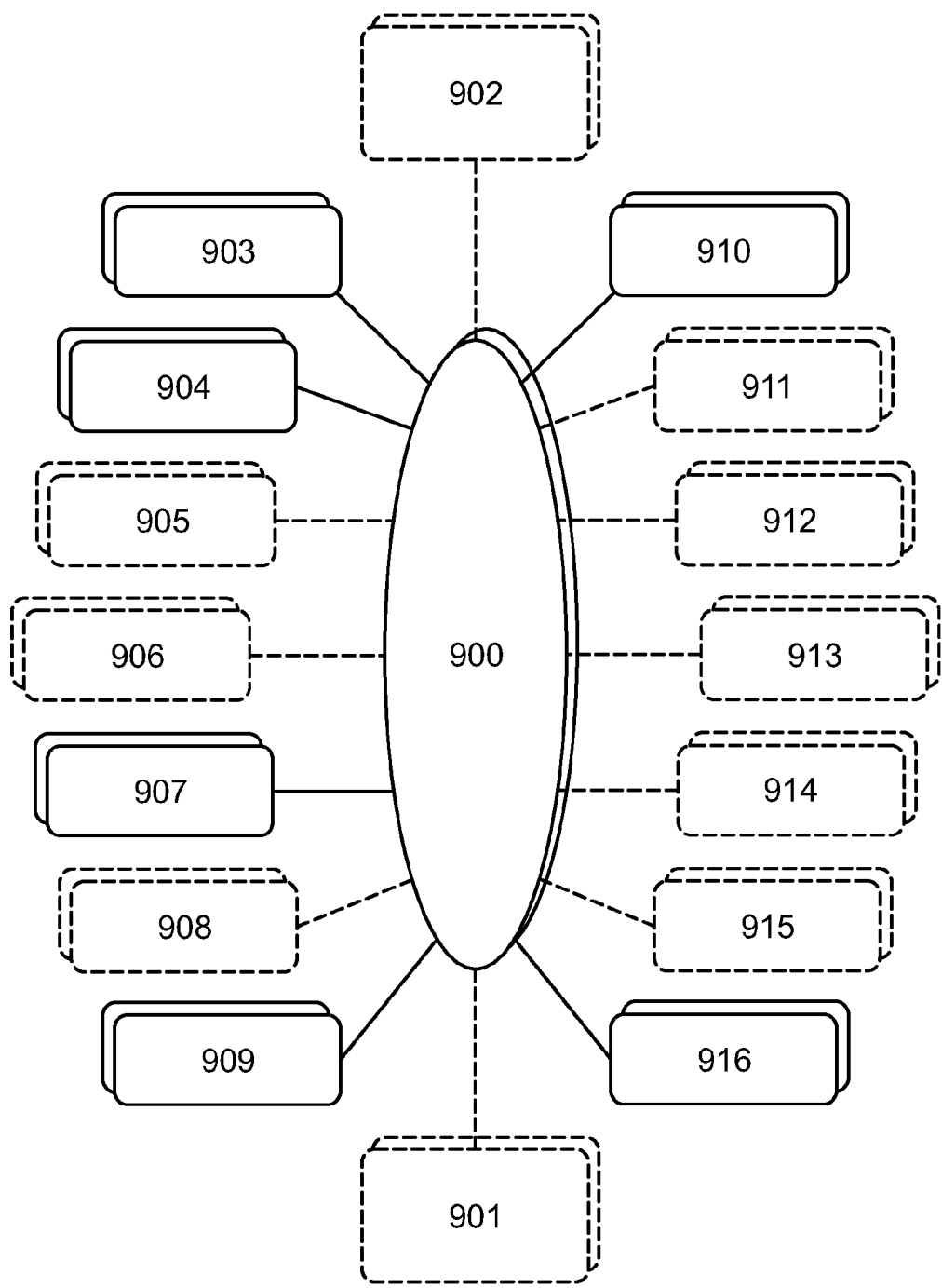
FIG. 9 shows a generic view of a master-less execution domain.

The communication architecture preferably relies on the previously mentioned dependable communication network TTEthernet. In such embodiment, data traffic of different criticality can co-exist on the RTCN. The communication architecture supports co-existence of different execution domains on the same RTCN without mutual interference. Such execution domains could be:

Non safety-related centralized master execution domain, see FIG. 7,

Safety-related centralized master execution domain, see FIG. 8,

Master-less execution domain, see FIG. 9,

FIGS. 7, 8 and 9 will be explained in further details below.

In a distributed control system, fault-tolerance may be obtained by replication of communication channels, including the RTCN switches, and of the DCNs.

Figure 2:
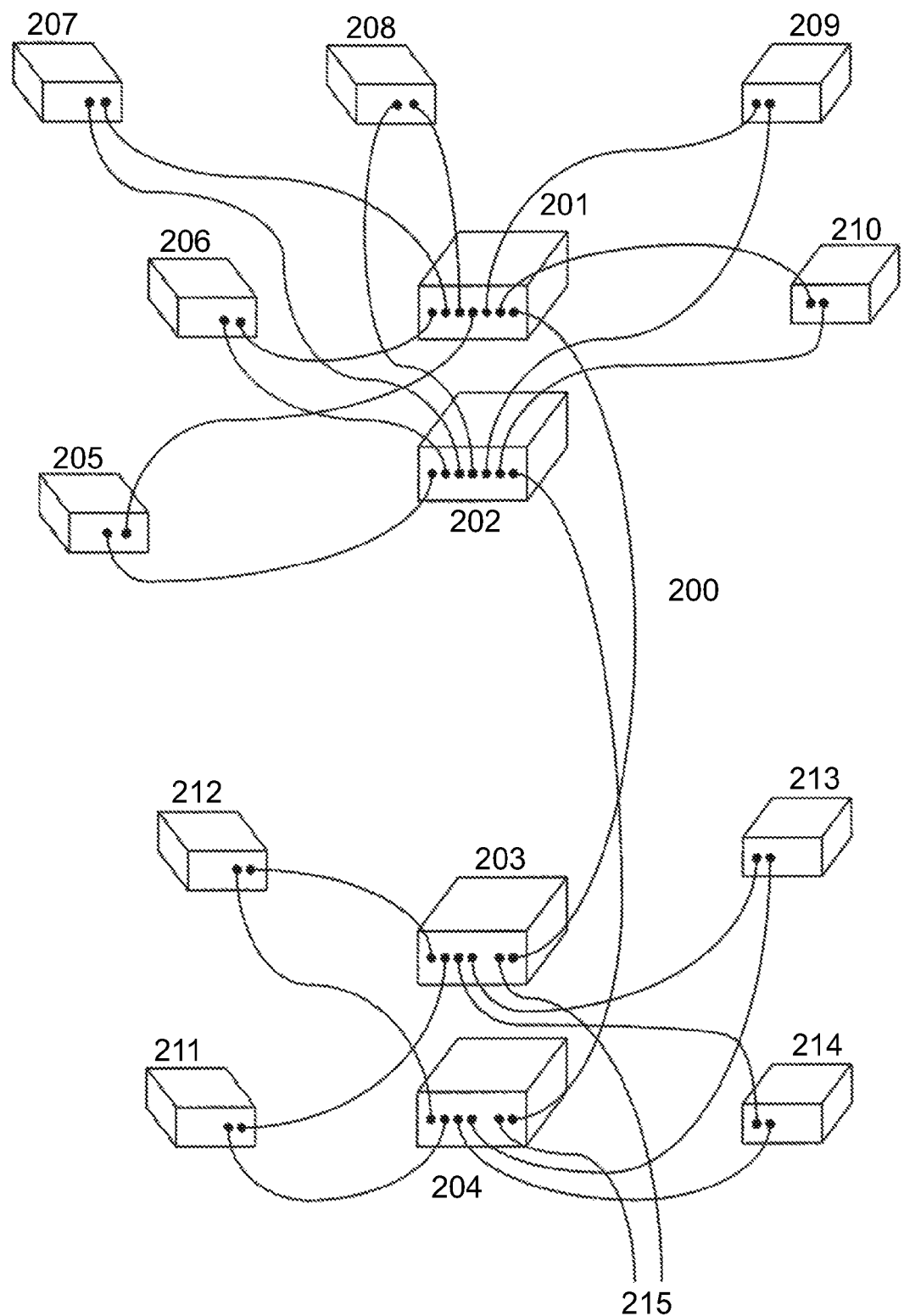
FIG. 2 shows an exemplified single fault-tolerant communication network.
Figure 3:
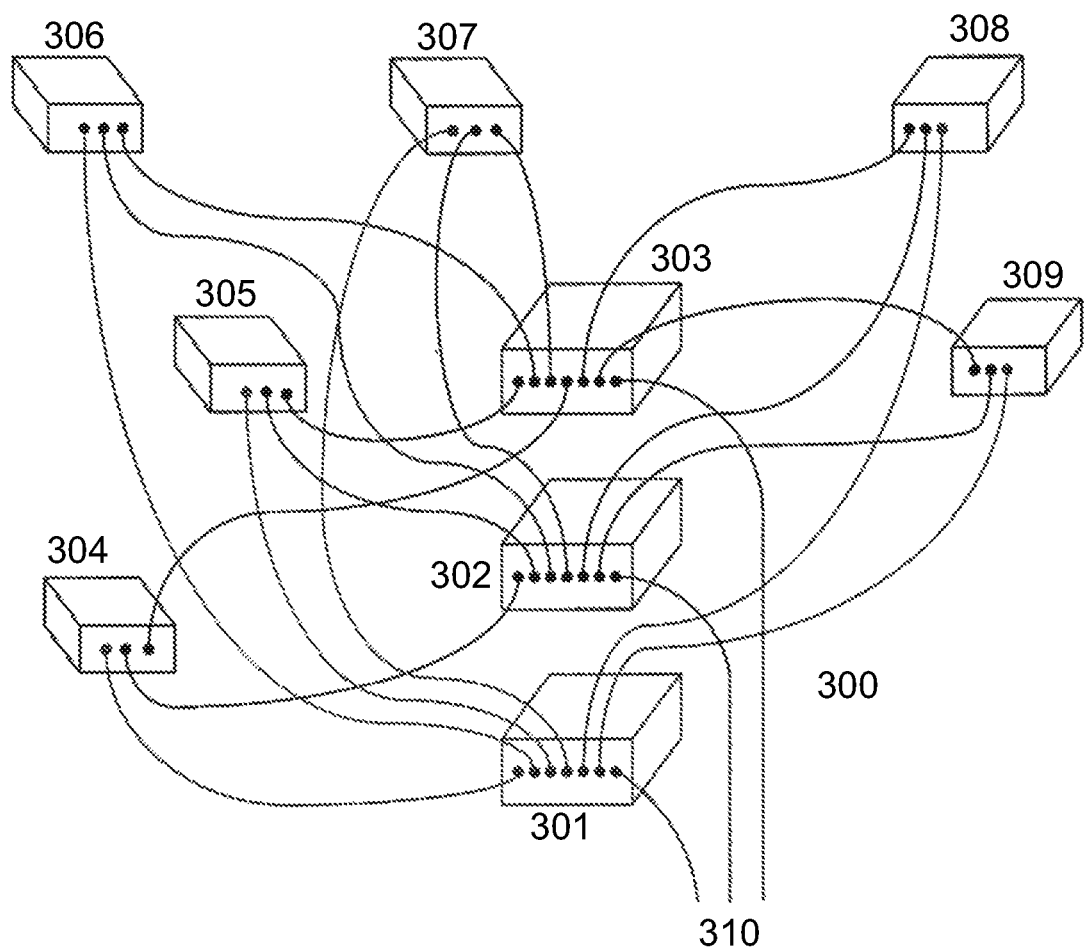
FIG. 3 shows an exemplified double fault-tolerant communication network.

FIGS. 2 and 3 show exemplified single fault-tolerant communication networks and exemplified double fault-tolerant communication networks, respectively.

Referring now to FIG. 2 replicated RTCN switches 201, 202 are in communication with DCNs 205-210. Similarly, replicated RTCN switches 203, 204 are in communication with DCNs 211-214. As seen in FIG. 2 each DCN is connected to two RTCN switches. A single fault-tolerant RT communication path 200 is provided between RTCN switches 201, 202 and 203, 204. Moreover, a RT communication path 215 is available for connection to other RTCN switches.

Referring now to FIG. 3 replicated RTCN switches 301-303 are in communication with DCNs 304-309 thereby forming a double fault-tolerant RTCN 300. As seen each DCN is connected to three RTCN switches thereby forming the double fault-tolerant configuration. A connection 310 to other RTCN switches is also available.

The RTCNs shown in FIGS. 2 and 3 are single and double fault-tolerant, respectively. It should be noted however, that triple or even multiple redundant RTCNs are applicable as well.

The distributed controllers can be replicated in two, three or more depending on the reliability requirement to each sub-system and on the chosen fault-tolerant architecture for the sub-system. In case the distributed controllers are inherently fault-tolerant physical replication is not required.

The DCNs preferably exhibit "fail-silent" behaviour in order to let the replicated node(s) maintain control over the controlled object. In case a DCN exhibiting fail-silent behaviour fails it will not disturb the operation of the wind turbine and possibly cause a critical system failure. Consequently fail-silent DCN will have very low risk of causing a critical system failure.

The fail-silent property must remain stable until service on the faulty unit, such as a DCN, has restored the system. This means that the fail-silent behaviour must be maintained with a very high probability in case of a second failure in the already faulty node. Otherwise the faulty node may disturb the operation of the wind turbine and possibly cause a critical system failure.

Single Fault-Tolerance

Figure 4:
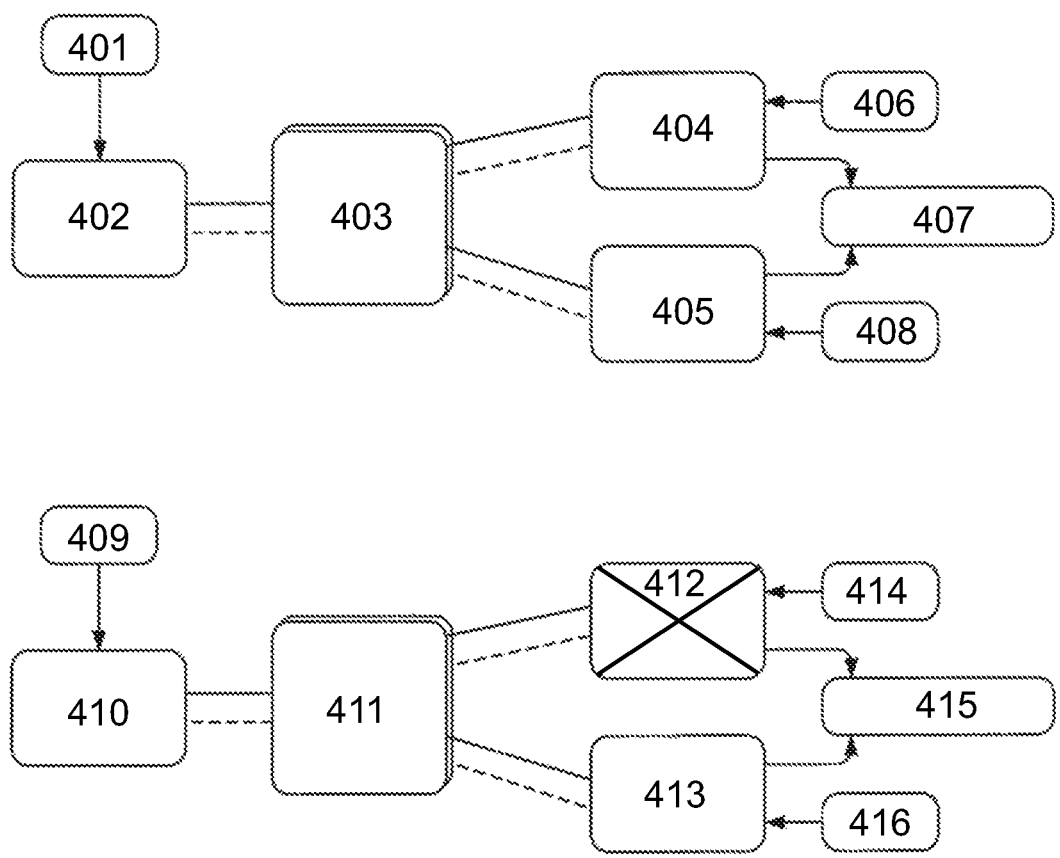
FIG. 4 shows an exemplified single fault scenario in a generic single fault-tolerant sub-system.

FIG. 4 shows a generic implementation view of a single fault-tolerant sub-system. The single fault-tolerant property is illustrated by the solid and dotted communication paths between replicated RTCN switches 403, 411 and DCNs 404, 405, 412, 413.

The DCNs 404, 405, 412, 413 can be implemented as active replicated nodes or as passive or cold stand-by nodes. Preferably, the DCNs operate as active replicated nodes. The DCNs have fail-safe behaviour in case of an internal failure. Sensor values are available to the DCNs as data on the RTCN and optionally also as local sensor data. Data can be utilized by the controllers in 1oo2 (1 out of 2), 2oo2 (2 out of 2) or 2oo3 (2 out of 3) redundancy schemes depending on the criticality of the function. However, other redundancy schemes are applicable as well.

The upper drawing in FIG. 4 shows a sub-system operating at normal working conditions. Sensors 406, 408 provide sensor signals to DCNs 404, 405 in order to control object 407. Moreover, sensor 401 provides sensor signals to DCN 402 which is in communication with DCNs 404, 405 via replicated RTCN switch 403.

In case of failure in one DCN 412, continued operation is secured by the replicated DCN 413, see the lower drawing in FIG. 4. Thus, control of object 415 is maintained with inputs from sensors 409, 416 and appropriate control of DCNs 410, 413 and replicated RTCN switch 411.

Figure 5:
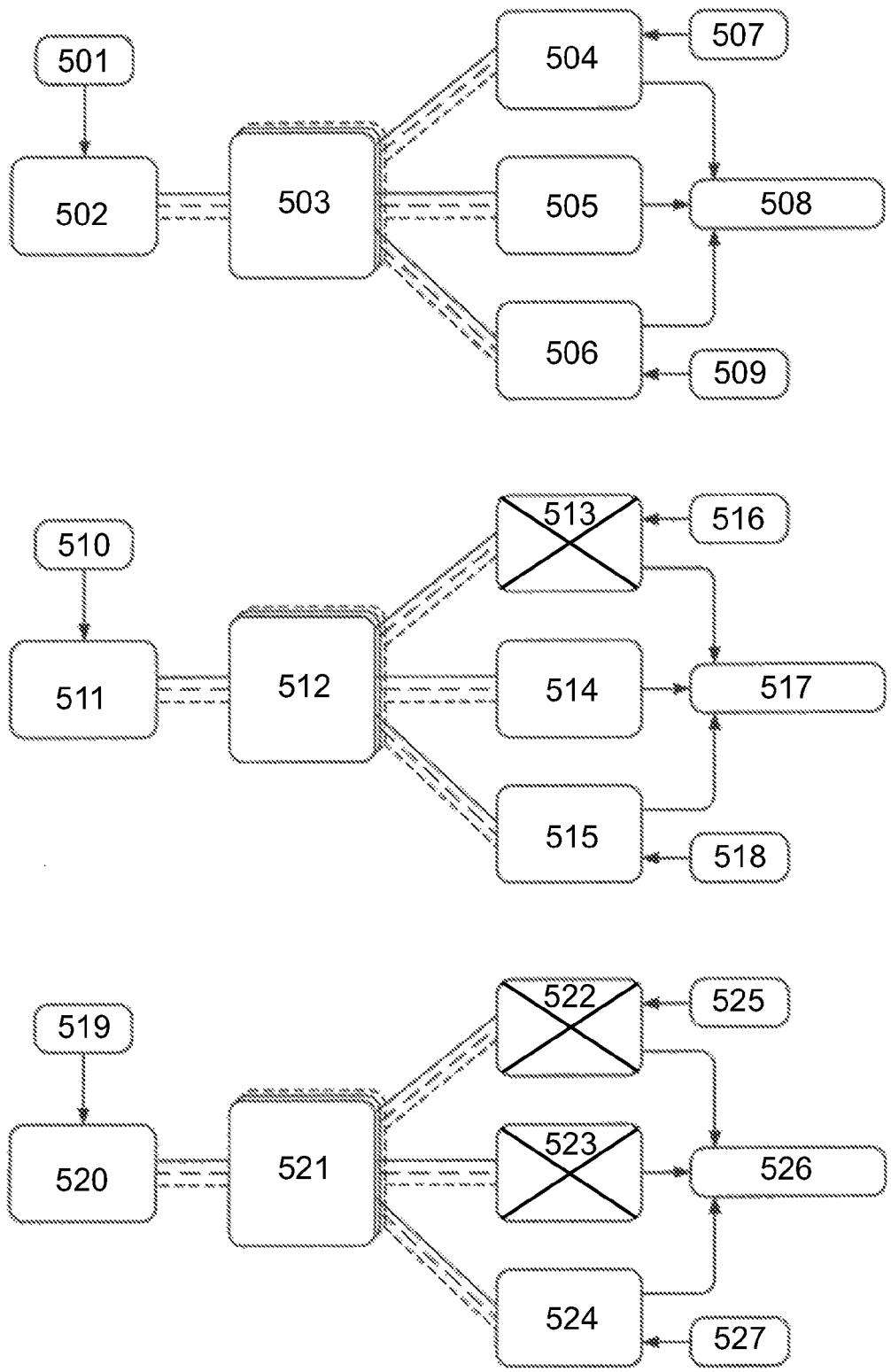
FIG. 5 shows an exemplified double-fault scenario in a generic double fault-tolerant sub-system.

If both DCNs 404, 405 or 412, 413 operate on the same data at the same time, replica determinism can be supported.
Double Fault-Tolerance FIG. 5 shows a generic implementation view of a double fault-tolerant sub-system. The double fault-tolerant property is illustrated by the solid and the two dotted communication paths between DCNs and replicated RTCN switches.

The DCNs can be implemented as active replicated nodes or as passive or cold stand-by nodes. Most preferably the DCNs operate as active replicated nodes. The DCNs have fail-safe behaviour in case of an internal failure. Sensors values are available to the DCNs as data on the RTCN and optionally also as local sensor data. The sensor data can be utilized by the controllers in 1oo2 (1 out of 2), 2oo2 (2 out of 2) or 2oo3 (2 out of 3) redundancy schemes depending on the criticality of the function. As mentioned above, other redundancy schemes are applicable as well.

The upper drawing in FIG. 5 shows a sub-system operating at normal working conditions. Sensors 507, 509 provide sensor signals to DCNs 504, 505, 506 in order to control object 508. Moreover, sensor 501 provides sensor signals to DCN 502 which is in communication with DCNs 504, 505, 506 via replicated RTCN switch 503.

In case of failure in a DCN 513, continued operation is secured by the remaining DCNs 514, 515, see the middle drawing in FIG. 5. Thus, control of object 517 is maintained with inputs from sensors 510, 518 and appropriate control of DCNs 511, 514, 515 and replicated RTCN switch 512.

In case of failure in two DCNs 522, 523, continued operation is still secured by the remaining DCN 524, see the lower drawing in FIG. 5. Thus, control of object 526 is maintained with inputs from sensors 519, 527 and appropriate control of DCNs 520, 524 and replicated RTCN switch 521.

If the DCNs of FIG. 5 operate on the same data at the same time, replica determinism can be supported.

Figure 6:
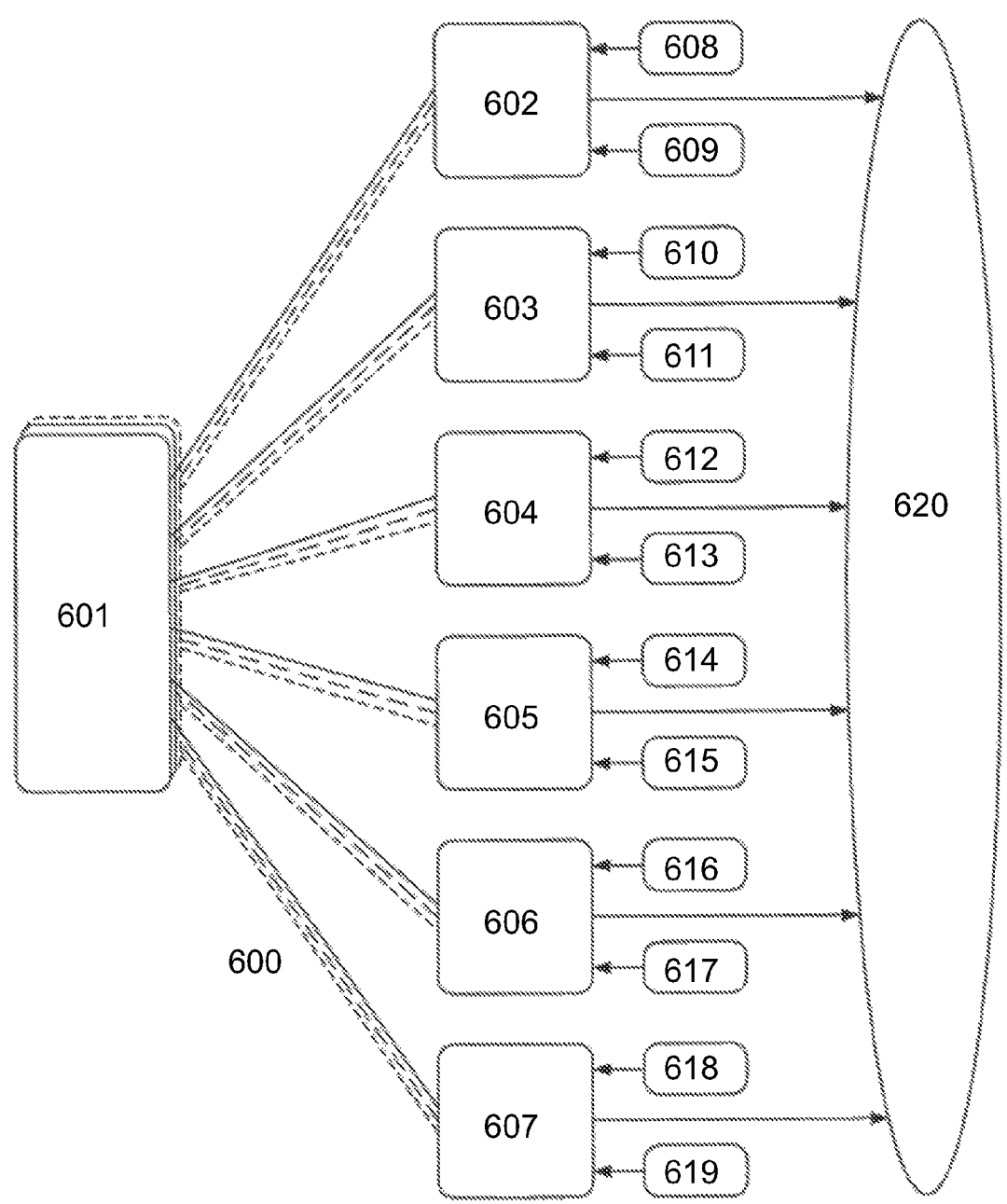
FIG. 6 shows an exemplified generic n+m redundant sub-system.

The control architecture shown in FIG. 5 satisfies the fault-tolerance required for the very high system reliability in e.g. mission critical systems, possibly with long mean time to repair after the first failure. Such systems could be "continuous mode" safety systems or high availability systems.
Fault-Tolerance Utilizing n+m Redundancy Control systems may benefit from a fault-tolerant architecture utilizing n+m redundancy, see FIG. 6, where m DCNs backup for n DCN. FIG. 6 shows a double fault tolerant RTCN 600 (indicated by solid and dotted lines) where a replicated RTCN switch 601 is in communication with six fail-silent DCNs 602-607. The six fail-silent DCNs 602-607 are configured to control a given object 620 of a wind turbine in response to sensor inputs from sensors 608-619.

The n+m replica deterministic DCNs 602-607 jointly execute control of the controlled object 620. Again, in case a DCN 602-607 with fail-safe behaviour fails it will not disturb the operation of the controlled object and consequently it will have very low probability of causing a critical system failure. Possible application areas for this type of redundancy could be the wind turbine yaw system and modular power converter systems.

As previously mentioned the Centralized Master Non Safety-Related Execution Domain comprises functions related to normal control of the wind turbine. Execution in this domain is characterized in a replicated master-slave paradigm utilizing one or more main controllers 701 and replicated DCNs 705, 707, 710, 714 and 716 interconnected by replicated RTCN 700, see the solid line elements of FIG. 4. The dashed-line elements are inactive is this domain. When utilizing a deterministic RTCN 700, this domain supports fault-tolerance by redundant replicated deterministic DCNs 705, 707, 710, 714 and 716. The replication of the RTCN 700 and the DCNs 705, 707, 710, 714 and 716 are illustrated as stacked structures (of RTCN and DCNs) in FIG. 7.

The Centralized Master Safety Control Execution Domain comprises safety-related functions related to protection of persons or assets. Execution in this domain is characterized in a centralized master paradigm utilizing replicated master safety controllers 802 (solid line) and associated replicated safety-related DCNs 806, 808, 811, 813 and 815 (solid line), see FIG. 8. The replicated controllers 802 and the replicated DCNs 806, 808, 811, 813 and 815 are interconnected by replicated RTCN 800 (solid line). The dashed line elements are inactive is this domain. When utilizing a deterministic RTCN, this domain supports fault-tolerance by redundant replica deterministic DCNs.

The Distributed Control Execution Domain enables a master-less approach to control. The approach supports fault-tolerance by redundant replica deterministic DCNs 903, 904, 907, 909, 910, 916 interconnected via replicated RTCN 900, see the solid line elements of FIG. 9. The dashed line elements are inactive. This domain applies no master controller(s) and the primary area of application for this domain is continuous-mode safety-related control. However, the paradigm can also be used in other safety-related and non-safety related controls.

In FIG. 9 a group of safety-related DCNs 903, 904, 907, 909, 910, 916 operate as data publishers and subscribers. The DCNs 903, 904, 907, 909, 910, 916 acquire data from e.g. sensor systems and publish the resulting data on the replicated RTCN 900. The other DCNs subscribe to the published data they need to perform their function. A given DCN can be both a publisher and a subscriber. As the data exchange is directly between DCNs, no main controller is required.

In distributed control systems, fault-tolerance and real-time properties can be supported by the establishment of a precise global time where the nodes have a common notion of time that deviates very little—typically in the range of a microsecond or less, however not limited to this precision. The global time supports:
  Synchronization of data acquisition across controllers and distributed nodes
  Synchronization of processes across controllers and distributed nodes
  Synchronization of data communication (time-triggered communication)
  Replica determinism in fault-tolerant controllers and distributed nodes The global time can be established by implementation of an IEEE-1588 compatible Precision Time Protocol. Alternatively, the global time can be established by utilizing the inherent support for a precision global time that is part of many industrial communication networks. In systems where the precision global time is critical to system availability and/or safety, a sufficient level of fault-tolerance and reliability must be established in the distribution of the precision global time.

Figure 10:
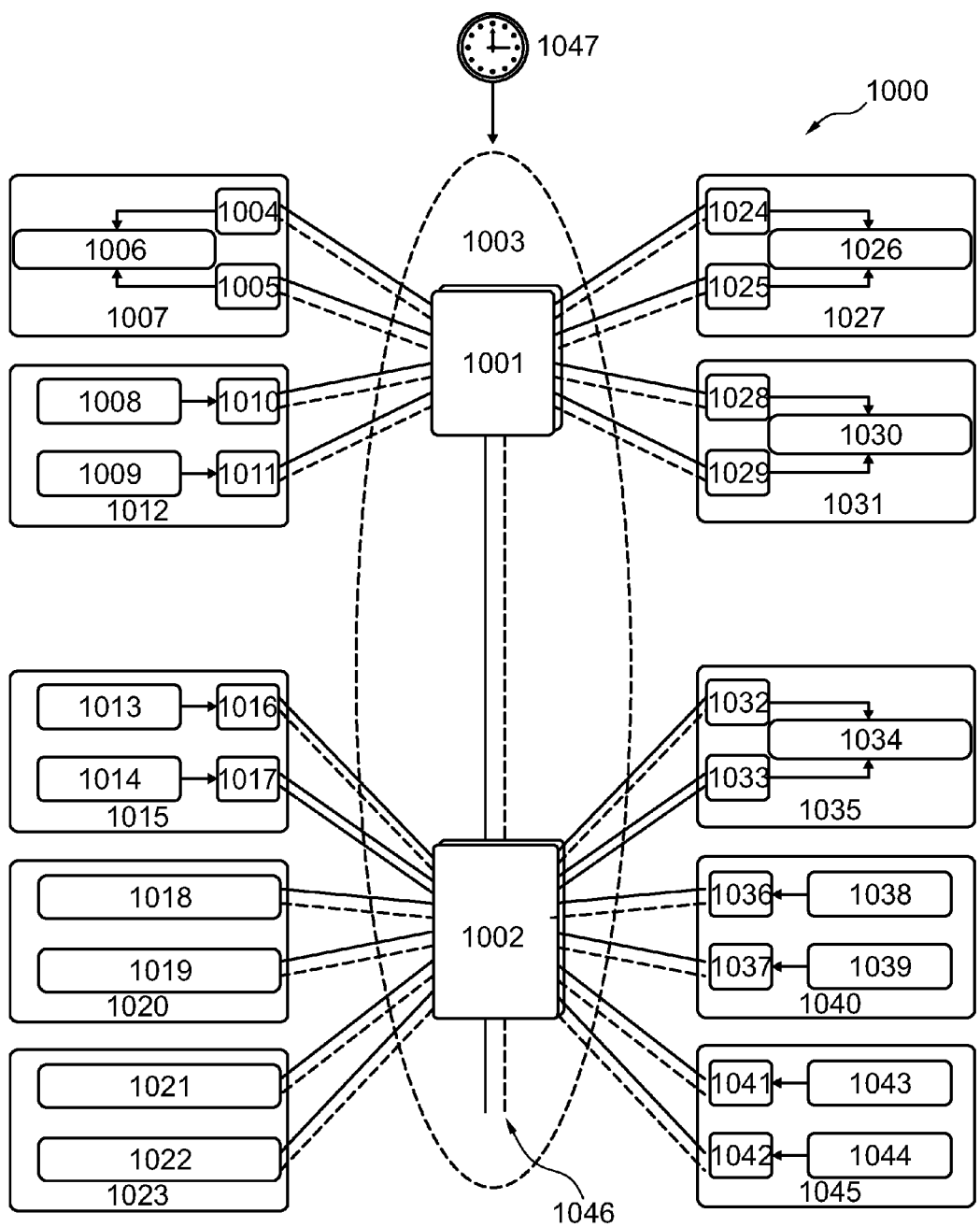
FIG. 10 shows a generic view of a precision global time domain.

A global time domain version of the generic RTCN shown in FIG. 1 is illustrated in FIG. 10 where sensors systems 1008, 1009, 1013, 1014, 1038, 1039, 1043 and 1044 for measurement of e.g. power, frequency, voltage, current, pressure or temperature are connected to respective replicated DCNs 1010, 1011, 1017, 1018, 1036, 1037, 1041 and 1042, either directly or optionally through e.g. field busses, peer-to-peer communication paths or any other type of interface. The sensor systems are positioned in Sub-System Assemblies (SSA) 1012, 1015, 1040 and 1045 together with associated DCNs. Other SSAs 1007, 1027, 1031 and 1035 comprise DCNs 1004, 1005, 1024, 1025, 1028, 1029, 1032 and 1033 for controlling respective objects 1006, 1026, 1030, 1034 of the wind power facility. The replicated DCNs acquire data from the sensor systems and publish the acquired data on the RTCN 1003, thus making the data available to other DCNs in the system via replicated RTCN switches 1001, 1002. The global time is indicated by 1047.

FIG. 10 depicts a single fault-tolerant generic RTCN 1003 according to an embodiment of the present invention. The single fault-tolerant property of the RTCN 1003 is illustrated by the solid and dotted communication paths between the replicated RTCN switches 1001, 1002 and the various DCNs of the RTCN 1003.

Main Controllers 1018, 1019 of SSA 1020, Safety Controllers 1021, 1022 of SSA 1023 and DCNs of other SSAs are interconnected connected via the RTCN 1003 that utilizes replicated RTCN switches 1001, 1002. The replicated RTCN switches 1001, 1002 are connected in a star-branch-star topology. However other network topologies are also applicable. The RTCN 1003 serve as the communication infrastructure that connects all DCNs in the control system. The RTCN 1003 can have connection to the power plant communication network through other replicated RTCN switches 1046. The RTCN 1003 may be non fault-tolerant, single fault-tolerant or double fault-tolerant depending on the reliability requirements.

In fault-tolerant implementations, primary/main controllers and DCNs generally have the capability to receive data from the two or more redundant RTCN channels and perform selection of a valid data package out of the available redundant data packages. The controllers and DCNs also have the capability to publish the same data at the same time on two or more redundant RTCN channels and thus make these data available to other DCNs in the system for selection of valid data. This property supports the reliability and safety of the system.

Moreover, in fault-tolerant implementations, primary/main controllers and DCNs in the system may support fault-tolerance by either "cold stand-by", "hot stand-by" or "active replica".

In a single fault-tolerant system, two controllers form a redundant pair in a control function. In cold stand-by, one controller is active and the other is turned off. In case of failure in the first controller, the second controller takes over the function of the failed controller after boot-up and initialization. In hot stand-by, one controller is active and the second controller is passive observer. In case of failure in the first controller, the second controller takes over the function. In active replica, both controllers are active, operate in synchrony on the same data, and thus produce the same output at the same time. In case one controller fails, the second controller preserves seamless control of the turbine. All three principles can be utilized in the present invention.

In a multiple fault-tolerant system, more redundant controllers are utilized. The redundancy principles are the same as for the single fault-tolerant systems.

Different levels of fault-tolerance can be applied to communication network and nodes depending on the reliability and safety requirements. The present invention is not limited to the examples shown.

The invention claimed is:

1. A modularized wind turbine facility comprising a plurality of sub-assemblies having a distributed fault-tolerant control system, the control system comprising:
   first and second pluralities of fault-tolerant controllers, wherein the first plurality of controllers is configured to generate respective transmission packages, said first and second pluralities of controllers being distributed in the plurality of sub-assemblies in accordance with the modularization of the wind turbine facility, wherein each of the first plurality of controllers is communicatively coupled with a respective sensor disposed within the plurality of sub-assemblies, and
   a fault-tolerant communication network for transmitting the respective transmission packages at essentially the same time to each of the second plurality of controllers via a plurality of replicated real-time communication network switches, wherein the plurality of replicated real-time communication network switches communicatively couple the plurality of sub-assemblies and are external to the plurality of sub-assemblies, wherein each of the second plurality of controllers is configured to characterize each of the respective transmission packages as either valid or invalid by comparing a data value in one of the respective transmission packages to data values in multiple ones of the respective transmission packages.

2. The modularized wind turbine facility according to claim 1, wherein the fault-tolerant communication network comprises a time-triggered Ethernet communication network.

3. The modularized wind turbine facility according to claim 2, wherein the time-triggered Ethernet communication network is implemented as at least one of a single fault-tolerant network and a double fault-tolerant network.

4. The modularized wind turbine facility according to claim 2, wherein the time-triggered Ethernet communication network is safety certified.

5. The modularized wind turbine facility according to claim 1, wherein the communication network supports functional safety classes low demand mode, high demand mode and continuous mode in accordance with IEC61508 standard.

6. The modularized wind turbine facility according to claim 5, wherein the functional safety classes are compliant with the requirements for at least one of Safety Integrity Level 2 and Safety Integrity Level 3.

7. The modularized wind turbine facility according to claim 1, wherein the respective sensors are arranged in a redundant manner.

8. The modularized wind turbine facility according to claim 1, wherein the respective sensors are adapted to measure at least one parameter relevant for the control of at least one sub-assembly of the plurality of sub-assemblies.

9. The modularized wind turbine facility according to claim 8, wherein each of the respective sensors generate respective sensor transmission packages and transmit the sensor transmission packages using the fault-tolerant communication network to the second plurality of controllers; and upon characterizing the sensor transmission packages as either valid or invalid, each of the second plurality of controllers controls the respective subassembly based on at least one of the valid sensor transmission packages.

10. The modularized wind turbine facility according to claim 1, further comprising at least two redundant primary controllers arranged in a replica deterministic configuration.

11. The modularized wind turbine facility according to claim 10, wherein the at least two redundant primary controllers comprise an active primary controller and one or more hot stand-by controllers.

12. The modularized wind turbine facility according to claim 10, wherein the at least two redundant primary controllers comprise an active primary controller and one or more cold stand-by controllers.

13. The modularized wind turbine facility according to claim 1, wherein each of the first and second pluralities of controllers comprises at least one of a primary controller and a distributed control node.

14. The modularized wind turbine facility according to claim 1, wherein a first transmission package of the respective transmission packages received at one of the second plurality of controllers is characterized as invalid when a data value in the first transmission package is an outlier compared to data values in the other transmission packages received at the one of the second plurality of controllers.

15. The modularized wind turbine facility according to claim 1, wherein the first plurality of controllers comprises the same type of controller as the second plurality of controllers,
wherein the second plurality of controllers also sends transmission packages to each of the first plurality of controllers at substantially the same time, and
wherein each of the first plurality of controllers characterize the transmission packages sent by the second plurality of controllers as either valid or invalid by comparing data values in the transmission packages to each other.

16. The modularized wind turbine facility according to claim 1, wherein characterizing each of the respective transmission packages comprises determining whether the data value in each of the respective transmission packages is a statistical outlier compared to the data values in multiple ones of the respective transmission packages.

17. The modularized wind turbine facility according to claim 1, wherein the fault tolerant communication network supports co-existence of different execution domains without interference, and wherein data traffic of different criticality can co-exist on the fault tolerant communication network.

18. The modularized wind turbine facility according to claim 1, the control system further comprising:
a plurality of sensors communicatively coupled with the first plurality of controllers, wherein the respective transmission packages comprise respective sensor measurements from the plurality of sensors, and
wherein, based on the respective sensor measurements, the second plurality of controllers control at least in part an operation of a component of the modularized wind turbine facility.

19. A method for controlling a modularized wind turbine facility comprising a plurality of sub-assemblies, the method comprising:
generating, using a first plurality of fault-tolerant controllers, a plurality of respective transmission packages, said first plurality of controllers and a second plurality of fault-tolerant controllers being distributed in the plurality of sub-assemblies in accordance with the modularization of the wind turbine facility, wherein each of the first plurality of controllers is communicatively coupled with a respective sensor disposed within the plurality of sub-assemblies, and
transmitting the respective transmission packages at essentially the same time to each of the second plurality of controllers via a plurality of replicated real-time communication network switches, wherein the plurality of replicated real-time communication network switches communicatively couple the plurality of sub-assemblies and are external to the plurality of sub-assemblies, wherein each of the second plurality of controllers is configured to characterize each of the respective transmission packages as either valid or invalid by comparing a data value in one of the respective transmission packages to data values in multiple ones of the respective transmission packages.

20. The method of claim 19, wherein the first plurality of controllers comprises the same type of controller as the second plurality of controllers,
wherein the second plurality of controllers also transmits transmission packages to each of the first plurality of controllers at substantially the same time, and
wherein each of the first plurality of controllers characterize the transmission packages sent by the second plurality of controllers as either valid or invalid by comparing data values in the transmission packages to each other.

21. The method of claim 19, wherein the first plurality of controllers comprises a different type of controller as the second plurality of controllers.

22. The method of claim 19, wherein the real-time communication network switches form a time-triggered Ethernet communication network implemented as a single fault-tolerant network or a double fault-tolerant network.

23. A control system of a wind turbine generator comprising:
first and second pluralities of fault-tolerant controllers, wherein the first plurality of controllers is configured to generate respective transmission packages, said first and second pluralities of controllers are distributed in a plurality of sub-assemblies within the wind turbine generator, wherein each of the first plurality of controllers is communicatively coupled with a respective sensor disposed within the plurality of sub-assemblies, and
a fault-tolerant communication network for transmitting the respective transmission packages at essentially the same time to the second plurality of controllers via a plurality of replicated real-time communication network switches, wherein the plurality of replicated real-time communication network switches communicatively couple the plurality of sub-assemblies and are external to the plurality of sub-assemblies, wherein each of the second plurality of controllers is configured to characterize each of the respective transmission packages as either valid or invalid by comparing a data value in one of the respective transmission packages to data values in multiple ones of the respective transmission packages.

24. A wind turbine generator comprising:

first and second pluralities of fault-tolerant controllers, wherein the first plurality of controllers is configured to generate respective transmission packages, said first and second pluralities of controllers are distributed in a plurality of sub-assemblies within the wind turbine generator, wherein each of the first plurality of controllers is communicatively coupled with a respective sensor disposed within the plurality of sub-assemblies, and a fault-tolerant communication network for transmitting the respective transmission packages at essentially the same time to the second plurality of controllers via a plurality of replicated real-time communication network switches, wherein the plurality of replicated real-time communication network switches communicatively couple the plurality of sub-assemblies and are external to the plurality of sub-assemblies, wherein the second plurality of controllers is configured to characterize each of the respective transmission packages as either valid or invalid by comparing a data value in one of the respective transmission packages to data values in multiple ones of the respective transmission packages.

* * * * *